(12) United States Patent
Valcarce Rial et al.

(10) Patent No.: US 12,192,892 B2
(45) Date of Patent: Jan. 7, 2025

(54) ESTIMATING POWER CONSUMPTION OF DIFFERENT TYPE OF RADIO ACCESS TECHNOLOGY

(71) Applicant: Nokia Solutions and Networks Oy, Espoo (FI)

(72) Inventors: Alvaro Valcarce Rial, Saint-Cloud (FR); Jakob Hoydis, Paris (FR)

(73) Assignee: Nokia Solutions and Networks Oy, Espoo (FI)

(*) Notice: Subject to any disclaimer, the term of this patent is extended or adjusted under 35 U.S.C. 154(b) by 484 days.

(21) Appl. No.: 17/647,253

(22) Filed: Jan. 6, 2022

(65) Prior Publication Data
US 2022/0232470 A1 Jul. 21, 2022

(30) Foreign Application Priority Data
Jan. 21, 2021 (FI) ...................................... 20215069

(51) Int. Cl.
*H04W 52/00* (2009.01)
*H04L 12/14* (2024.01)
(Continued)

(52) U.S. Cl.
CPC ......... *H04W 52/00* (2013.01); *H04L 12/1403* (2013.01); *H04L 41/16* (2013.01); *H04W 24/02* (2013.01)

(58) Field of Classification Search
CPC ...... G06N 3/045; G06N 3/08; H04L 12/1403; H04L 41/16; H04L 43/08; H04W 24/02;
(Continued)

(56) References Cited

U.S. PATENT DOCUMENTS 10,785,721 B1   9/2020  Bontempi et al.
2008/0141048 A1  6/2008  Palmeer et al. .............. 713/300
(Continued)

FOREIGN PATENT DOCUMENTS

CN    106576275 A    4/2017
CN    109511144 A    3/2019
(Continued)

OTHER PUBLICATIONS

"5G-era Mobile Network Cost Evolution", GSMA, Aug. 28, 2019, 50 pages.
(Continued)

*Primary Examiner* — Awet Haile
(74) *Attorney, Agent, or Firm* — Nokia Technologies Oy

(57) ABSTRACT

A method including determining types of radio access technologies supported by the apparatus, wherein the apparatus supports at least two types of radio access technologies, providing inputs to machine learning models, wherein the machine learning models include a corresponding machine learning model to each type of radio access technology, and for each type of radio access technology parameters associated with that type of radio access technology are provided as an input to the corresponding machine learning model, and obtaining, for each type of the radio access technologies, a power consumption estimate provided by the corresponding machine learning model.

18 Claims, 7 Drawing Sheets

(51) Int. Cl.
*H04L 41/16* (2022.01)
*H04W 24/02* (2009.01)

(58) Field of Classification Search
CPC .. H04W 52/00; H04W 52/0206; H04W 88/10
See application file for complete search history.

(56) References Cited

U.S. PATENT DOCUMENTS

| | | | |
|---|---|---|---|
| 2016/0309411 A1* | 10/2016 | Savolainen | ....... H04W 52/0209 |
| 2017/0118715 A1 | 4/2017 | Bhattacharya et al. | |
| 2019/0104480 A1* | 4/2019 | Hasholzner | ............. G06F 1/324 |
| 2019/0166534 A1* | 5/2019 | Williammee | ......... H04W 36/14 |
| 2020/0281035 A1 | 9/2020 | Di Pietro et al. | |
| 2021/0084601 A1 | 3/2021 | Rofougaran et al. | ................ 56/1 |
| 2021/0345138 A1 | 11/2021 | Vandikas et al. | .................... 24/4 |
| 2022/0095085 A1* | 3/2022 | Volkerink | ........... H04W 56/001 |

FOREIGN PATENT DOCUMENTS

| | | |
|---|---|---|
| CN | 111107651 A | 5/2020 |
| CN | 112119655 A | 12/2020 |
| CN | 112686411 A | 4/2021 |
| EP | 2772862 A1 | 9/2014 |
| WO | 2017/069842 A1 | 4/2017 |
| WO | WO-2019210953 A1 * | 11/2019 ........... H04B 7/0617 |
| WO | 2020/038544 A1 | 2/2020 |
| WO | WO-2020076145 A1 | 4/2020 |
| WO | WO-2022/000365 A1 | 1/2022 |

OTHER PUBLICATIONS

Climate Action Handbook, GSMA, 2019, 21 pages.
Nasreddine et al., "Estimating Base Station Power Consumption Using Regression", 3rd International Conference on Bioengineering for Smart Technologies (BioSMART), Apr. 24-26, 2019, pp. 1-4.
Stockman et al., "A Novel Approach to Memory Power Estimation Using Machine Learning", International Conference on Energy Aware Computing, Dec. 16-18, 2010, 3 pages.
Office action received for corresponding Finnish U.S. Appl. No. 20/215,069, dated Jun. 21, 2021, 8 pages.
Office action received for corresponding Finnish U.S. Appl. No. 20/215,069, dated Dec. 20, 2021, 6 pages.
Notice of Allowance received for corresponding Chinese Patent Application No. 202210072460.X, dated Jul. 2, 2024, 4 pages of office action and no page of translation available.
Notice of Allowance received for corresponding European Patent Application No. 22151158.7, dated Jul. 3, 2024, 8 pages.

* cited by examiner

ESTIMATING POWER CONSUMPTION OF DIFFERENT TYPE OF RADIO ACCESS TECHNOLOGY

FIELD

The following exemplary embodiments relate to wireless communication and different technologies used for achieving wireless communication.

BACKGROUND

Wireless communication may be achieved by different technologies. Also, different technologies have different features and therefore different functionalities and capabilities. Yet at least some of those different technologies may coexist and may be supported by one apparatus. If an apparatus is able to support multiple radio access technologies, benefits are achieved as a user may have wireless communication that is better and available.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to determine types of radio access technologies supported by the apparatus, wherein the apparatus supports at least two types of radio access technologies, provide inputs to machine learning models, wherein the machine learning models comprise a corresponding machine learning model to each type of radio access technology, and for each type of radio access technology parameters associated with that type of radio access technology are provided as an input to the corresponding machine learning model, and obtain, for each type of the radio access technologies, a power consumption estimate provided by the corresponding machine learning model.

According to a second aspect there is provided an apparatus comprising means for determining types of radio access technologies supported by an apparatus, wherein the apparatus supports at least two types of radio access technologies, providing inputs to machine learning models, wherein the machine learning models comprise a corresponding machine learning model to each type of radio access technology, and for each type of radio access technology parameters associated with that type of radio access technology are provided as an input to the corresponding machine learning model, and obtaining, for each type of the radio access technologies, a power consumption estimate provided by the corresponding machine learning model.

According to a third aspect there is provided a method comprising determining types of radio access technologies supported by an apparatus, wherein the apparatus supports at least two types of radio access technologies, providing inputs to machine learning models, wherein the machine learning models comprise a corresponding machine learning model to each type of radio access technology, and for each type of radio access technology parameters associated with that type of radio access technology are provided as an input to the corresponding machine learning model, and obtaining, for each type of the radio access technologies, a power consumption estimate provided by the corresponding machine learning model.

According to a fourth aspect there is provided a computer program comprising instructions for causing an apparatus to perform at least the following: determine types of radio access technologies supported by the apparatus, wherein the apparatus supports at least two types of radio access technologies, provide inputs to machine learning models, wherein the machine learning models comprise a corresponding machine learning model to each type of radio access technology, and for each type of radio access technology parameters associated with that type of radio access technology are provided as an input to the corresponding machine learning model, and obtain, for each type of the radio access technologies, a power consumption estimate provided by the corresponding machine learning model.

According to a fifth aspect there is provided a computer program product comprising instructions for causing an apparatus to perform at least the following: determine types of radio access technologies supported by the apparatus, wherein the apparatus supports at least two types of radio access technologies, provide inputs to machine learning models, wherein the machine learning models comprise a corresponding machine learning model to each type of radio access technology, and for each type of radio access technology parameters associated with that type of radio access technology are provided as an input to the corresponding machine learning model, and obtain, for each type of the radio access technologies, a power consumption estimate provided by the corresponding machine learning model.

According to a sixth aspect there is provided a computer program comprising instructions stored thereon for performing at least the following: determine types of radio access technologies supported by the apparatus, wherein the apparatus supports at least two types of radio access technologies, provide inputs to machine learning models, wherein the machine learning models comprise a corresponding machine learning model to each type of radio access technology, and for each type of radio access technology parameters associated with that type of radio access technology are provided as an input to the corresponding machine learning model, and obtain, for each type of the radio access technologies, a power consumption estimate provided by the corresponding machine learning model.

According to a seventh aspect there is provided a non-transitory computer readable medium comprising program instructions for causing an apparatus to perform at least the following: determine types of radio access technologies supported by the apparatus, wherein the apparatus supports at least two types of radio access technologies, provide inputs to machine learning models, wherein the machine learning models comprise a corresponding machine learning model to each type of radio access technology, and for each type of radio access technology parameters associated with that type of radio access technology are provided as an input to the corresponding machine learning model, and obtain, for each type of the radio access technologies, a power consumption estimate provided by the corresponding machine learning model.

According to an eight aspect there is provided non-transitory computer readable medium comprising program instructions stored thereon for performing at least the following: determine types of radio access technologies supported by the apparatus, wherein the apparatus supports at least two types of radio access technologies, provide inputs to machine learning models, wherein the machine learning models comprise a corresponding machine learning model to each type of radio access technology, and for each type of radio access technology parameters associated with that type of radio access technology are provided as an input to the corresponding machine learning model, and obtain, for each type of the radio access technologies, a power consumption estimate provided by the corresponding machine learning model.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
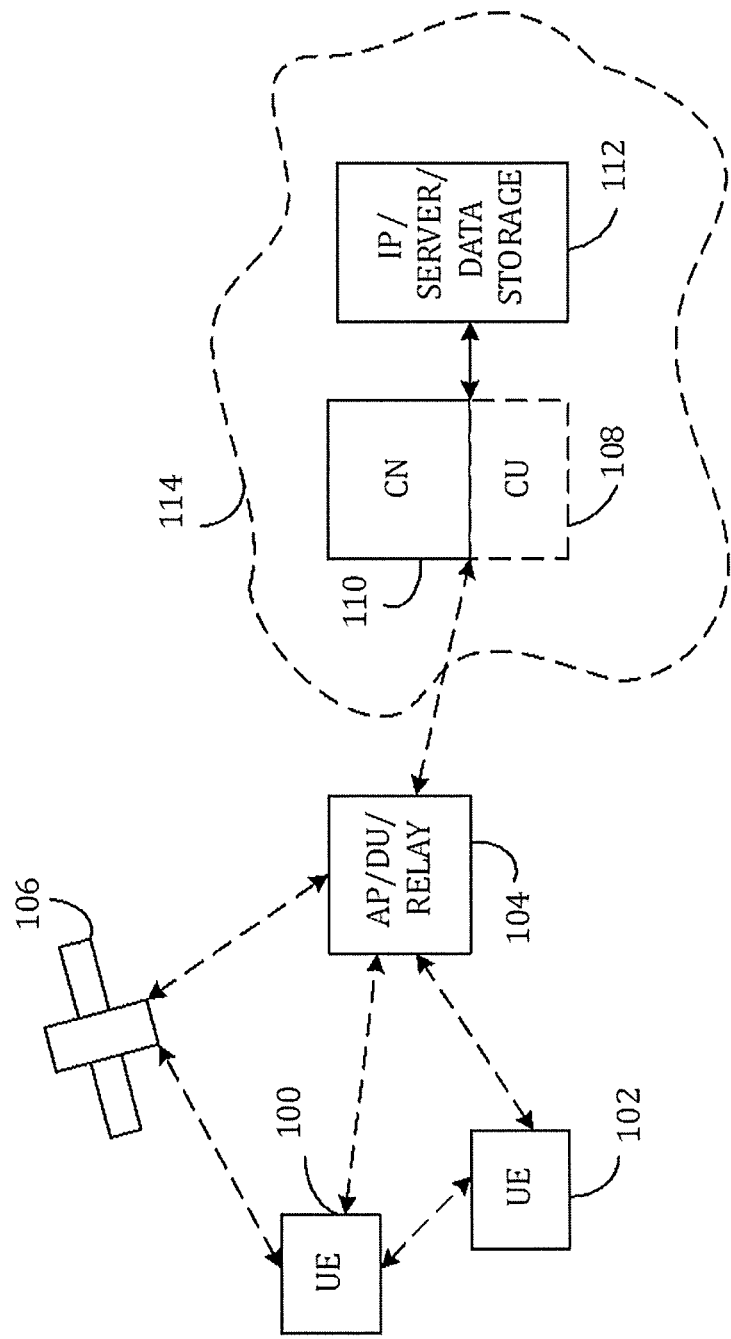

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A terminal device may also be a device having capability to operate in Internet of Things (IoT) network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc.

Radio access technology, RAT, may be understood as a physical connection method for a radio-based communication network. RAT types thus comprise for example 2G, 3G, 4G and 5G. Apparatuses may support multiple RAT types which may be understood as being able to have a wireless connection using the supported RAT types. Different types of RAT have different capabilities and therefore also their characteristics, such as power consumption and usage of hardware resources may differ. Power consumption of future networks may also exceed current power consumption due to for example increased cellular densities and massive MIMO. Therefore, energy monitoring of any large-scale infrastructure is advantageous in order to be able to track energy consumption and, if possible, adjust functionalities such that energy consumption is reduced.

Base stations consume a significant portion of the energy required by a RAN. For example, power amplifiers comprised in a base station have significant power consumption as well as baseband processing and switching. A base station may support multiple types of RATs and it may be of interest therefore to monitor how much of the power consumed is caused by different RATs. The base station may comprise a power meter that may indicate the total power consumption of the base station. However, that result does not indicate how much each of the RAT types is consuming power and therefore it may be challenging to understand what an effect each RAT type has to the total power consumption. Further, as the base station may comprise modules, that may comprise hardware and/or software resources, the modules may be shared among the different RATs supported by the base station. Due to the sharing, it may not be possible to know which RAT type is responsible for utilizing resources of certain modules at a given time for example.

In order to be able to at least estimate the power consumption caused by each RAT type in a base station, machine learning may be utilized. Machine learning models may be categorized broadly as supervised or unsupervised. Supervised models may apply what has been learned in the past using labelled examples to predict future events. A supervised algorithm may require a set of data known as training data, comprising input data and labels that are considered as the output values of machine learning algorithms. Starting from the analysis of the training data, the machine learning algorithm produces a model, such as a mathematical model, that makes predictions about the output values. After sufficient training, the model may provide accurate output values for any new input data. The accuracy of the model, that is, the adequacy of the training may be validated by techniques such as cross-validation method. When training, some part of the labelled training data is not used for training but saved for estimating the model accuracy, that is, if the model gives a correct label to an already known output value. An unsupervised algorithm in turn takes a set of data that comprises input data without labels and finds a structure in the input data, like grouping or clustering of data points. Therefore, unsupervised methods do not need a labelled input data for training in contrast to supervised methods but may learn from input data that has not been labelled.

Multiple supervised machine learning models exist and one example of a supervised machine learning model is an artificial neural network, ANN, which may also be referred to as a neural network. An artificial neural network comprises connected neurons that loosely resemble neurons in a biological brain. The neurons are computing entities which, when connected, can form one or more layers. A connection between two neurons resembles a synapse in a biological brain. The selection of training data has a significant impact on how well the algorithm executed on the framework offered by the neural network learns to provide correct and reliable results as the algorithm learns to recognize patterns of the training data and thereby is able to recognize new data. As the learning is based on patterns, the better the patterns are extracted from the training data, the better the algorithm can learn.

Figure 2B:
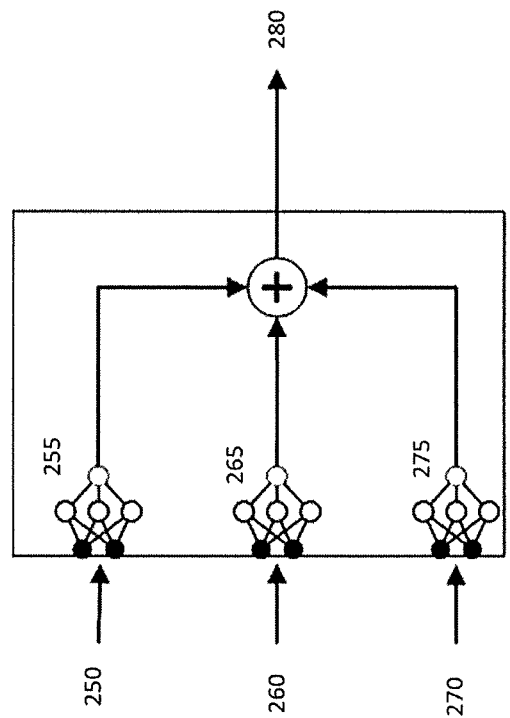
FIGS. 2A and 2B illustrate an exemplary embodiment of a base station supporting multiple types of RAT and machine learning methods associated with it.
Figure 2A:
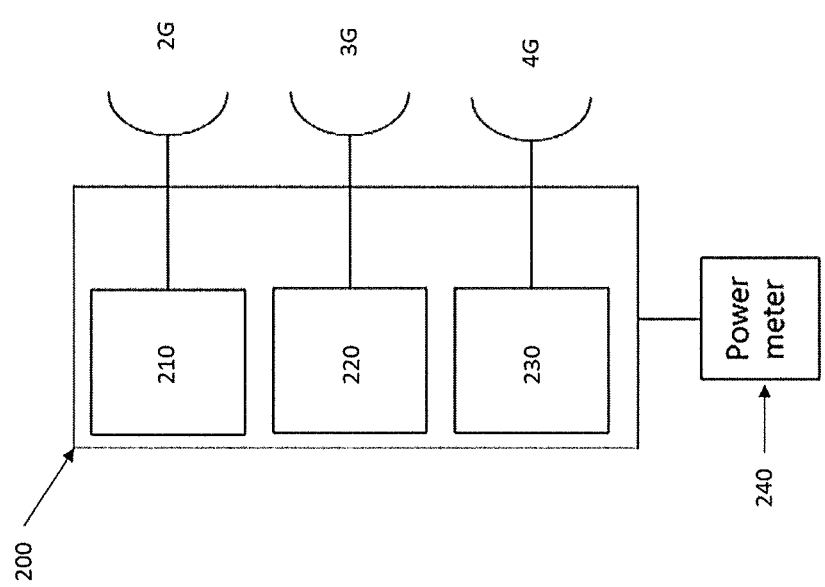

FIG. 2A and 2B illustrate an exemplary embodiment of utilizing machine learning model to estimate power consumption of each type of RAT supported by a base station. If a base station supports a RAT, the base station is considered to be able to provide base station related functionality of that RAT. In FIG. 2A a base station 200 supporting three types of RATs 210, 220 and 230 is illustrated. It is to be noted that also another amount of types of RATs could be supported. The RAT type 210 in this exemplary embodiment is 2G, RAT type 220 is 3G and RAT type 230 is 4G. In some other exemplary embodiments, some other RAT types could be supported as well. In this exemplary embodiment, the base station 200 comprises a power meter 240 from which a measurement of the total power consumption of the base station may be obtained. The power meter may be a DC power meter for example. The power meter is not capable of measuring power per each type of RAT supported by the base station 200. However, there are several parameters associated with the different types of RAT that may be obtained and associated with the total power consumption at a given time. The parameters include for example internal system counters and key performance indicators, KPIs. In some exemplary embodiments, also a system-wide power measurement available for a base station supporting a single type of RAT for the estimation of RAT-specific power consumption may be obtained. In other words, massive amounts of data relating to the base station may be available. This data may thus be used to train a set of artificial neural networks that learn the existing correlations between load relating to a specific type of RAT supported and power consumption.

For a base station, the total power consumption of the base station may be obtained from a power meter and the measured power may be associated with various parameters at a given time. The parameters may be key performance indicators such as traffic load experienced by a RAT, temperature, time of a day, humidity etc. Using thus one or more parameters as inputs and the corresponding power consumption as an output, a data set for training a machine learning model may be obtained.

FIG. 2B illustrates using a set of artificial neural networks for the base station 200. For each type a RAT supported by the base station, a corresponding ANN is trained. In this exemplary embodiment, the ANN 255 corresponds to 2G, ANN 265 corresponds to 3G and ANN 275 corresponds to 4G. Each RAT type may be considered as a subsystem of the base station 200 and for each subsystem there may be a corresponding ANN trained. It is to be noted that in some other exemplary embodiments, there may be additional ANNs trained to model for example the power consumption of other base station subsystems such as baseband processing. It is also to be noted that although ANN is used in this exemplary embodiment, any other suitable machine learning model could be utilized as well.

In this exemplary embodiment, fully-connected layers are used in each ANN and the layers are stacked together such that those resemble a multi layer perceptron, MLP. An MLP comprises at least three layers of nodes: an input layer, a hidden layer and an output layer. In this exemplary embodiment however, the ANNs do not share any hidden layers.

In this exemplary embodiment, the ANNs are trained using the same set of training data and validation data. As inputs for the ANNs parameters available for each type of RAT are provided. For example, the parameters may comprise one or more of the following: traffic load, which is proportional to the RAT-specific RF power as measured by the radio frequency, RF, counters; uplink and downlink spectral occupation; backhaul load; CPU load; and contextual information, such as timestamp, temperature, and/or humidity. In addition to traffic load, also factors such as temperature may affect the power consumption of the bases station. Therefore, the more inputs that are available to the ANNs, the more complex the model and the more likely it may be that it finds non-evident patterns in the data.

In this exemplary embodiment, in order to minimize a generalisation error, the data be obtained from a collection of base station configurations is as heterogeneous as possible, in terms of RF configuration. For example, counters data is obtained from base stations that have only 2G is active, plus from base stations that only 3G active, base stations that have only 4G active, as well as various combinations of these. Additionally, different RF power configurations are sampled, and the data is obtained as input data.

Input data is associated with a power consumption and the associate power consumption is used, in this exemplary embodiment, as the output data when training the model. In this exemplary embodiment, each of the ANNs are trained to build a consistent model of the power consumption of its respective RAT from observing the total power consumption as well as the available KPIs for the associate type of RAT. The ANNs then, for a given input, provide a power consumption estimate for its associated type of RAT. As the power consumption estimates are then added, the total power consumption of the base station is obtained. Thus, the ANN 255 is provided with input 250, that comprises parameters such as traffic load experience by 2G, the ANN 265 is provided with input 260 that comprises parameters such as traffic load experienced by 3G, and the ANN 275 is provided with input 270 that comprises parameters such as traffic load experienced by 4G. The outputs of the ANN 255, the ANN 265 and the ANN 275 are then added together as the total power consumption estimate 280. After the model is trained, it can be deployed to a base station. This deployment may be done as software update for example.

Figure 3:
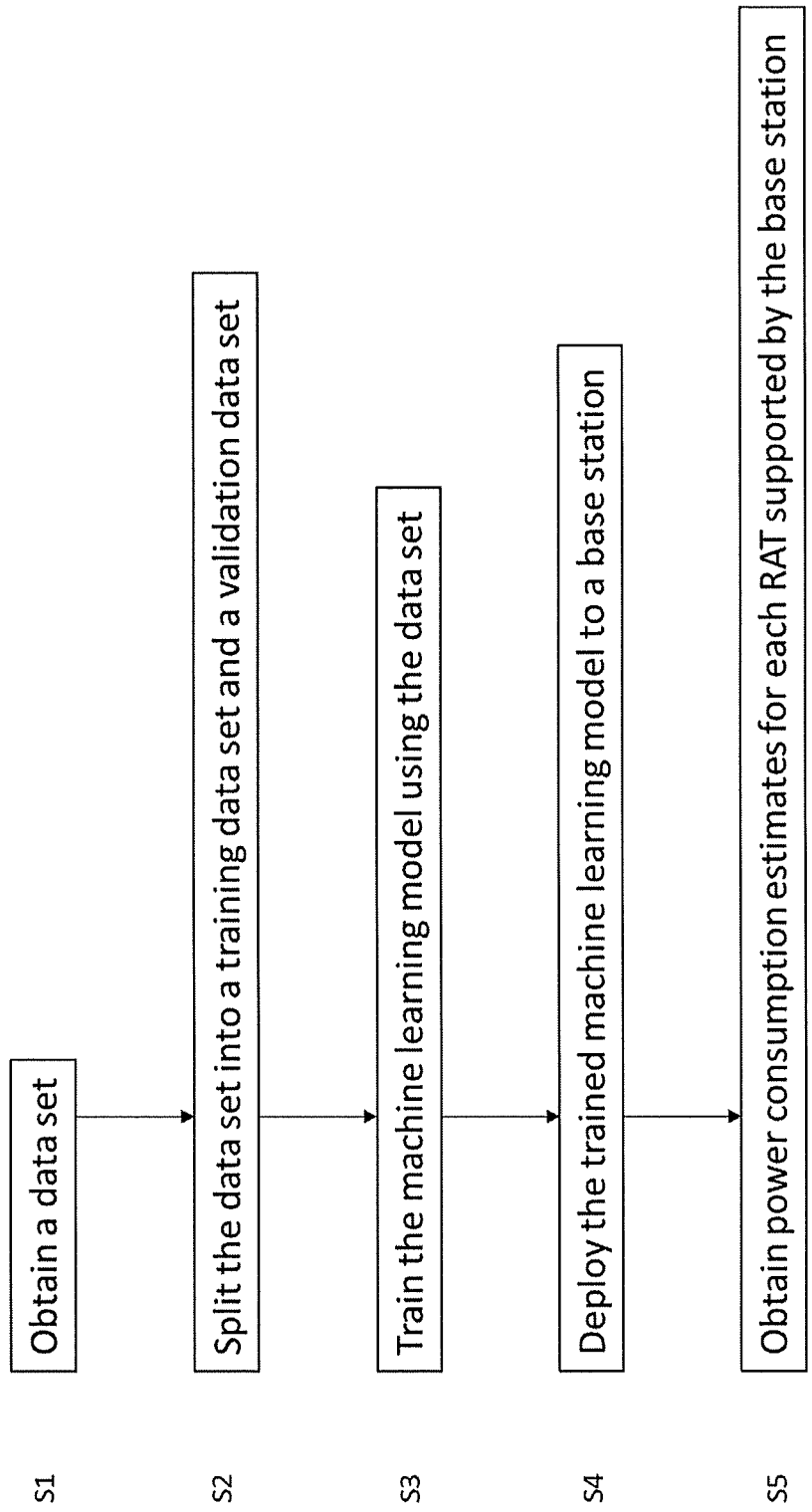
FIGS. 3 and 4 illustrate flow charts according to exemplary embodiments.

FIG. 3 illustrates a flow chart according to an exemplary embodiment in which the machine learning models, such as ANN, are trained and then deployed to estimate power consumption of each type of RAT supported by a base station. First, in S1, a data set for training and for evaluation is obtained. The data set obtained may be as explained above for example. The data set may be obtained for example from one or more base stations during their usage, from simulations and/or from testing in laboratory. The more data there is and the more versatile the data, the more likely it is that the machine learning models will find relevant correlations in the data thereby providing better results when deployed. It is to be noted that for each RAT type supported by the base station, a corresponding machine learning model will be trained.

Next, in S2, the obtained data set is split into a training data set and a validation data set. The training data set is used to train the machine learning models and the machine learning models are thereby trained with the same training data. The training data comprises input and its associated output. The input comprises parameters such as traffic load and the output comprises power consumption of the base station. The results of the training may be evaluate using the evaluation data in which comprises an input not provided during the training and the power consumption associated with the input.

Then, in S3, the machine learning models are trained using the training data set. The results of the training are then evaluated using the evaluation data set. The machine learning models trained provide power consumption estimates for the types RAT they are associated with and the provided power consumption estimates are then added together to get an estimate of the total power consumption. The estimate of the total power consumption may then be compared to the actual power consumption measured and based on this comparison, a total cost of error function may be determined. The total cost of error function may then be used to modify the machine learning models during training. The modifications may comprise for example modifying weights and biases of each of the machine learning models. Once it is evaluated that the training is completed, the machine learning models are deployed in S4.

Once the machine learning models are deployed, at a given time input may be provided to the trained machine learning models. During deployment, each of the machine learning models is provided with input that comprises parameters, such as traffic load, corresponding to the type of RAT the machine learning model corresponds to. In other words, the input for each machine learning model is different. For each type of RAT, a power consumption estimate is the provided by the corresponding machine learning model. Thus, in S5, a power consumption estimate may be obtained for each type of RAT supported by the base station. For a given input, the trained machine learning models provide a power consumption estimate for the type of RAT the machine learning model is associated with. Thus, the power consumption of an individual RAT supported by the base station may be obtained and there may not be a need to add the power consumption estimates together or the sum may be disregarded. In some exemplary embodiments, the power consumption estimates for the different RAT types may be obtained periodically which would allow monitoring of the long-term developments regarding power consumption of the different RAT types.

If the power consumption estimates are added together, that result may optionally be compared to the power consumption measurement obtained for the base station from a power meter for example. The difference may then be compared to a threshold value, which may be pre-determined for example. If the difference is more than the threshold value, then an indication may be provided. The indication may be a trigger to evaluate if a re-training is required. The indication may be provided in any suitable from and it may be provided to a device for example.

Figure 4:
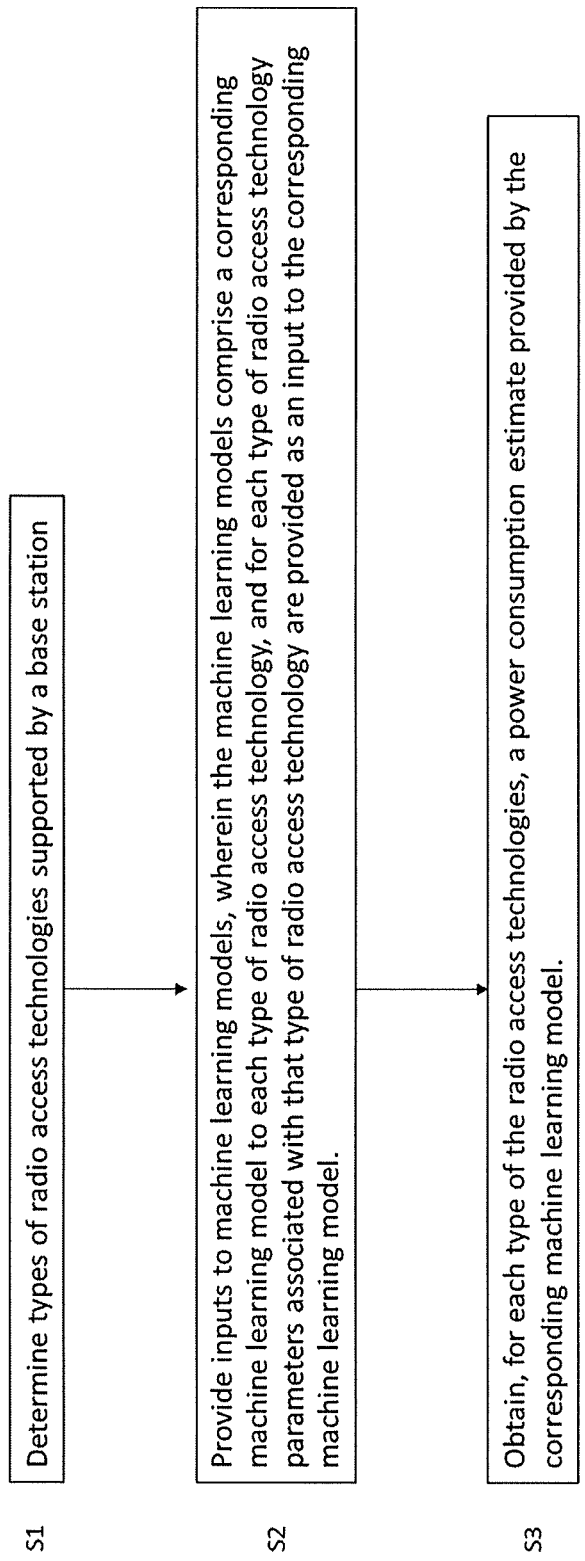

FIG. 4 illustrates a flow chart according to an exemplary embodiment. In this exemplary embodiment in S1 the types of radio access technologies supported by a base station are determined. Then in S2 inputs to machine learning models are provided, wherein the machine learning models comprise a corresponding machine learning model to each type of radio access technology, and for each type of radio access technology parameters associated with that type of radio access technology are provided as an input to the corresponding machine learning model. Finally, in S3 for each type of the radio access technologies, a power consumption estimate provided by the corresponding machine learning model is obtained.

Training and using machine learning models according exemplary embodiments described above have been tested on an simulator of multi-RAT base station power consumption. The various parameters of the model are summarized in Table 1.

TABLE 1

| Hyperparameter | Value |
| --- | --- |
| Sample size | 1024 |
| Learning rate | 0.3 |
| Number of training epochs | 8000 |
| 2G ANN layers size | [1] |
| 3G ANN layers size | [64, 1] |
| 4G ANN layers size | [16, 1] |
| Activation function | RELU |
| Optimizer | RMSProp |

Figure 5:
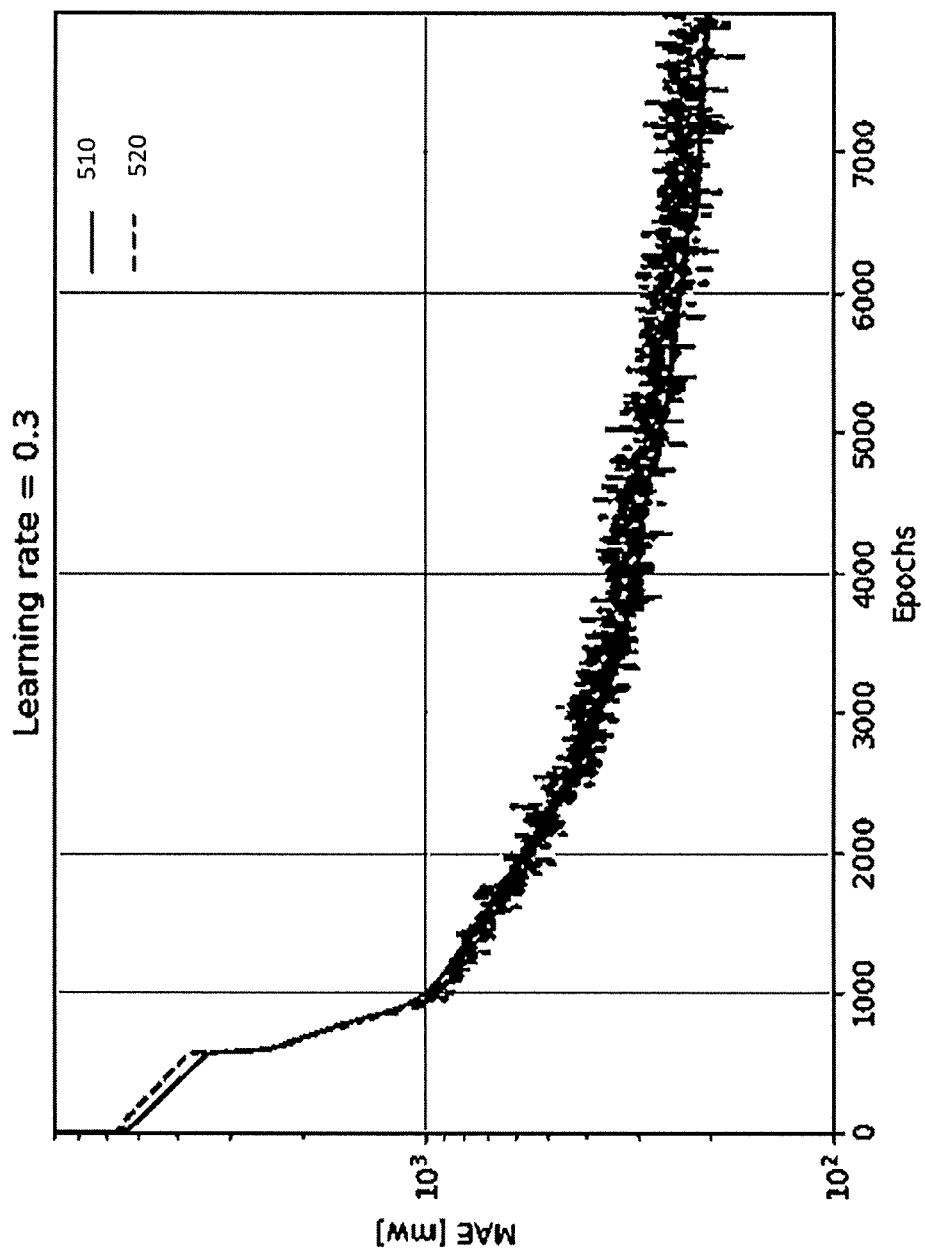
FIGS. 5 and 6 illustrate simulation results.
Figure 6:
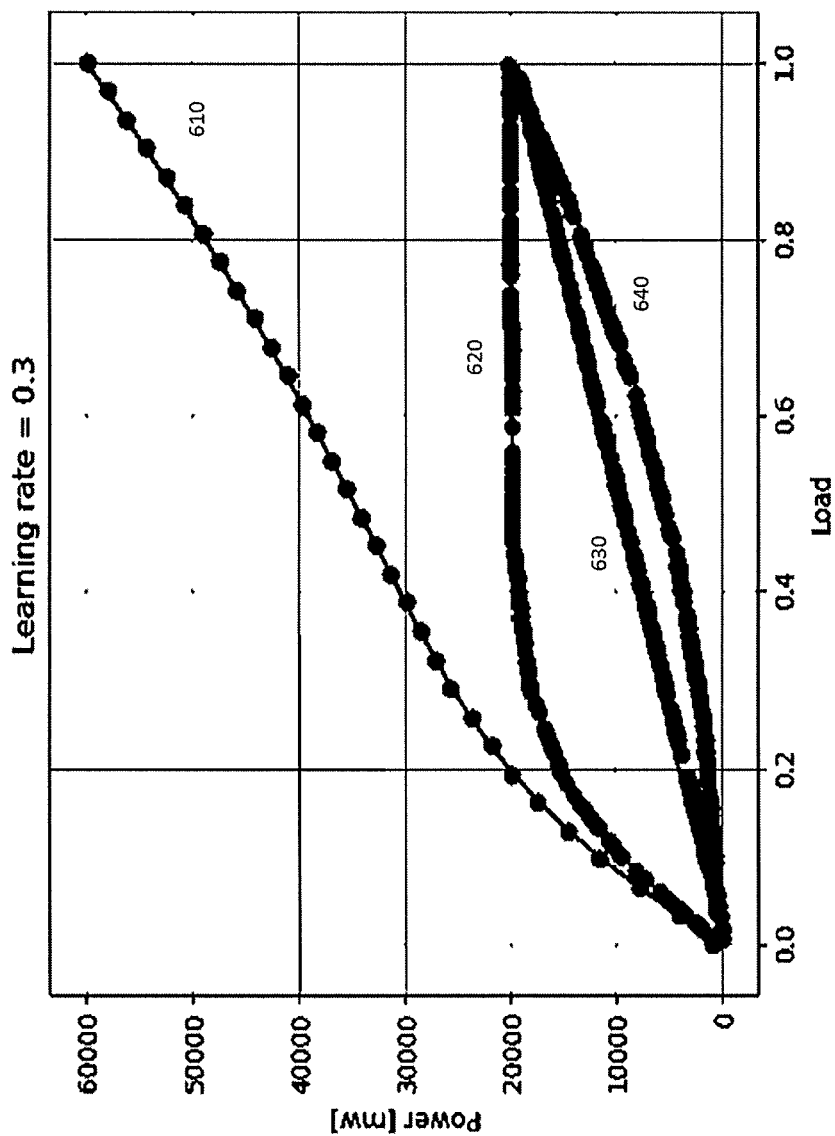

FIG. 5 illustrates the evolution of the training and validation error during training. Basic training value is illustrated as 510 and basic validation is illustrated as 520. Lower errors may be possible with lower learning rates. FIG. 6 illustrates, the predictions of the RAT-specific power consumptions for different RAT-specific loads as well as the total power estimate. In graph 610, the line illustrates the total power consumption and the dots along the line illustrate the estimates for total power consumption. Graph 620 illustrates the estimates of power consumption in view of the total for 3G, Graph 630 for 2G and graph 640 for 4G.

The exemplary embodiments described above may enable rather accurate estimation of power consumption of a certain RAT type in a base station that supports multiple RAT types. The estimates may be obtained at a given time or at given intervals or in any other suitable periodicity.

Figure 7:
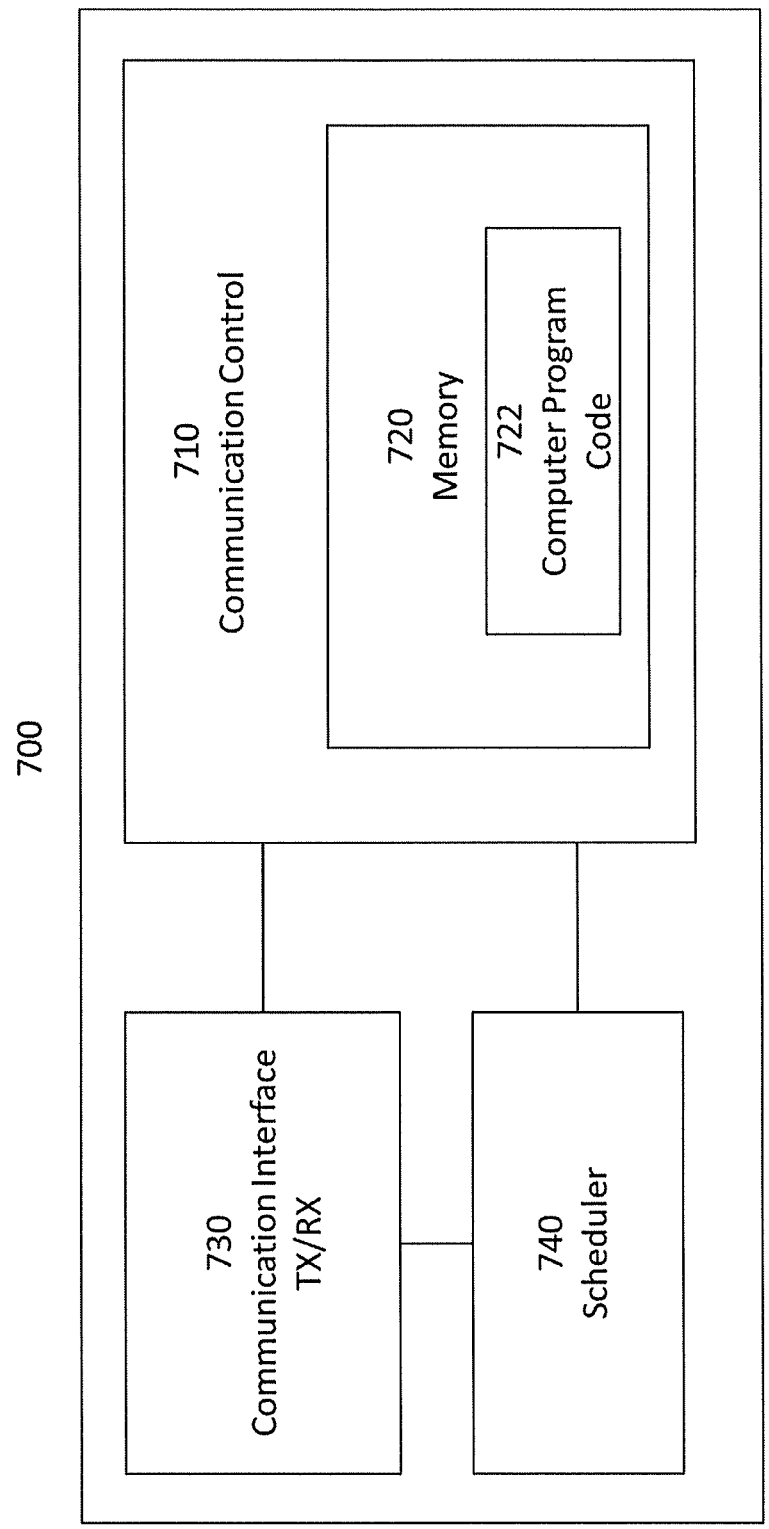
FIG. 7 illustrates an exemplary embodiment of an apparatus.

The apparatus 700 of FIG. 7 illustrates an example embodiment of an apparatus that may be a base station or be comprised in a base station. The apparatus may be, for example, a circuitry or a chipset applicable to an access node to realize the described embodiments. The apparatus 700 may be an electronic device comprising one or more electronic circuitries. The apparatus 700 may comprise a communication control circuitry 710 such as at least one processor, and at least one memory 720 including a computer program code (software) 722 wherein the at least one memory and the computer program code (software) 722 are configured, with the at least one processor, to cause the apparatus 700 to carry out any one of the example embodiments of the access node described above.

The memory 720 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 700 may further comprise a communication interface 730 comprising hardware and/or software for realizing communication connectivity according to one or more communication protocols. The communication interface 730 may provide the apparatus with radio communication capabilities to communicate in the cellular communication system. The communication interface may, for example, provide a radio interface to terminal devices. The apparatus 700 may further comprise another interface towards a core network such as the network coordinator apparatus and/or to the access nodes of the cellular communication system. The apparatus 700 may further comprise a scheduler 740 that is configured to allocate resources.

The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are execute by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

It is to be noted that the apparatus 700 may further comprise various component not illustrated in the FIG. 7. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor, and
   at least one non-transitory memory including a computer program code, wherein the at least one memory and the computer program code are configured, with the at least one processor, to cause the apparatus to:
   determine types of radio access technologies supported by the apparatus, wherein the apparatus supports at least two types of radio access technologies;

provide inputs to machine learning models, wherein the machine learning models comprise a corresponding machine learning model to each type of radio access technology, and for each type of radio access technology parameters associated with that type of radio access technology are provided as an input to the corresponding machine learning model;

obtain, for each type of the radio access technologies, a power consumption estimate provided by the corresponding machine learning model; and determine a total cost of error function based on comparing a power consumption measurement obtained for the apparatus and a sum of the power consumption estimates obtained for each type of radio access technologies.

2. An apparatus according to claim 1, wherein the apparatus is further caused to modify, for each type of radio access technology, the associated machine learning model based on the total cost of error function.

3. An apparatus according to claim 1, wherein the apparatus is further caused to determine if a difference between the sum of the power consumption estimates obtained for each type of radio access technologies and the power consumption measurement is bigger than a threshold and if it is, providing an indication indicating that the difference is greater than the threshold.

4. An apparatus according to claim 1, wherein at least one machine learning model comprises an artificial neural network.

5. An apparatus according to claim 1, wherein the parameters comprise at least a traffic load for the corresponding type of radio access technology.

6. An apparatus according to claim 1, wherein the machine learning models have been trained using a same training data set and a same validation data set.

7. An apparatus according to claim 1, wherein supporting a type of radio access technology comprises providing base station functionalities for the said type of radio access technology.

8. An apparatus according to claim 1, wherein the apparatus is a base station.

9. A method comprising:
determining types of radio access technologies supported by an apparatus, wherein the apparatus supports at least two types of radio access technologies;
providing inputs to machine learning models, wherein the machine learning models comprise a corresponding machine learning model to each type of radio access technology, and for each type of radio access technology parameters associated with that type of radio access technology are provided as an input to the corresponding machine learning model;
obtaining, for each type of the radio access technologies, a power consumption estimate provided by the corresponding machine learning model; and
determining a total cost of error function based on comparing a power consumption measurement obtained for the apparatus and a sum of the power consumption estimates obtained for each type of radio access technologies.

10. A method according to claim 9, wherein the method further comprises modifying, for each type of radio access technology, the associated machine learning model based on the total cost of error function.

11. A method according to claim 9, wherein the method further comprises determining if a difference between the sum of the power consumption estimates obtained for each type of radio access technologies and the power consumption measurement is bigger than a threshold and if it is, providing an indication indicating that the difference is greater than the threshold.

12. A method according to claim 9, wherein the parameters comprise at least a traffic load for the corresponding type of radio access technology.

13. A non-transitory computer readable medium comprising program instructions for causing an apparatus to perform at least the following:
determine types of radio access technologies supported by the apparatus, wherein the apparatus supports at least two types of radio access technologies;
provide inputs to machine learning models, wherein the machine learning models comprise a corresponding machine learning model to each type of radio access technology, and for each type of radio access technology parameters associated with that type of radio access technology are provided as an input to the corresponding machine learning model;
obtain, for each type of the radio access technologies, a power consumption estimate provided by the corresponding machine learning model; and
determine a total cost of error function based on comparing a power consumption measurement obtained for the apparatus and a sum of the power consumption estimates obtained for each type of radio access technologies.

14. A non-transitory computer readable medium according to claim 13, further comprising program instructions for causing the apparatus to at least modify, for each type of radio access technology, the associated machine learning model based on the total cost of error function.

15. A non-transitory computer readable medium according to claim 13, further comprising program instructions for causing the apparatus to at least determine if a difference between the sum of the power consumption estimates obtained for each type of radio access technologies and the power consumption measurement is bigger than a threshold and if it is, providing an indication indicating that the difference is greater than the threshold.

16. A non-transitory computer readable medium according to claim 13, wherein at least one machine learning model comprises an artificial neural network.

17. A non-transitory computer readable medium according to claim 13, wherein the parameters comprise at least a traffic load for the corresponding type of radio access technology.

18. A non-transitory computer readable medium according to claim 13, wherein the machine learning models have been trained using a same training data set and a same validation data set.

* * * * *